United States Patent
Clússerath

(10) Patent No.: US 9,694,988 B2
(45) Date of Patent: Jul. 4, 2017

(54) CONVEYOR SYSTEM FOR CONTAINER PROCESSING MACHINES

(71) Applicant: KHS GmbH, Dortmund (DE)

(72) Inventor: Ludwig Clússerath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/780,113

(22) PCT Filed: Mar. 26, 2014

(86) PCT No.: PCT/EP2014/000817
§ 371 (c)(1),
(2) Date: Sep. 25, 2015

(87) PCT Pub. No.: WO2014/161643
PCT Pub. Date: Oct. 9, 2014

(65) Prior Publication Data
US 2016/0039617 A1 Feb. 11, 2016

(30) Foreign Application Priority Data

Apr. 3, 2013 (DE) .......................... 10 2013 103 310

(51) Int. Cl.
| | |
|---|---|
| *B65G 29/00* | (2006.01) |
| *B65G 47/84* | (2006.01) |
| *B67C 3/22* | (2006.01) |
| *B67C 7/00* | (2006.01) |

(52) U.S. Cl.
CPC ........... *B65G 47/846* (2013.01); *B65G 29/00* (2013.01); *B67C 3/22* (2013.01); *B67C 7/0046* (2013.01)

(58) Field of Classification Search
CPC ................................ B65G 29/00; B65G 47/84
USPC .......... 198/474.1, 478.1, 479.1, 480.1, 836.1
See application file for complete search history.

(56) References Cited

U.S. PATENT DOCUMENTS

| | | | | |
|---|---|---|---|---|
| 4,075,086 | A * | 2/1978 | Marsh, III | B07C 5/122 198/473.1 |
| 5,082,105 | A * | 1/1992 | Tincati | B65G 47/846 198/473.1 |
| 5,404,227 | A * | 4/1995 | Sumita | B07C 5/126 198/343.1 |
| 5,718,323 | A * | 2/1998 | Flix | B65G 47/082 198/459.1 |

(Continued)

FOREIGN PATENT DOCUMENTS

| | | |
|---|---|---|
| DE | 198 35 369 | 10/1999 |
| DE | 10 2008 010 080 | 8/2009 |

(Continued)

*Primary Examiner* — Douglas Hess
(74) *Attorney, Agent, or Firm* — Occhiuti & Rohlicek LLP

(57) ABSTRACT

A conveyor system includes a rotating conveyor element with container holders arranged around a circumference thereof for moving containers between container positions, and a securing installation that suspends the conveyor element. The securing installation includes a structural element that forms an axis of rotation. A projecting portion of the structural element projects beyond the conveyor element's underside. A functional element, which is either a transfer installation or a guiding element is held at this projecting portion so that it can interact with the conveyor element.

13 Claims, 4 Drawing Sheets

(56) References Cited

U.S. PATENT DOCUMENTS

| | | | |
|---|---|---|---|
| 6,186,313 B1 * | 2/2001 | Spatafora | B65B 19/04 198/474.1 |
| 6,276,514 B1 * | 8/2001 | Cochin | B65G 47/846 198/459.2 |
| 6,938,753 B2 * | 9/2005 | Bonatti | B65G 47/847 198/470.1 |
| 7,438,192 B1 * | 10/2008 | Kohler | B07C 5/3404 209/523 |
| 7,823,717 B2 * | 11/2010 | Zanini | B65B 43/46 198/470.1 |
| 8,561,783 B2 * | 10/2013 | McAllister | B65G 47/846 198/473.1 |
| 8,651,853 B2 * | 2/2014 | Dupuis | B29C 49/421 198/459.8 |
| 8,813,950 B2 * | 8/2014 | Papsdorf | B65G 29/00 198/473.1 |
| 8,925,710 B2 * | 1/2015 | Borgatti | B65G 47/847 198/463.1 |
| 9,302,856 B2 * | 4/2016 | Papsdorf | B65G 29/00 |
| 2002/0078769 A1 | 6/2002 | Giometti | |
| 2012/0201920 A1 | 8/2012 | Aldigeri et al. | |

FOREIGN PATENT DOCUMENTS

| | | |
|---|---|---|
| DE | 10 2008 018 516 | 10/2009 |
| DE | 10 2011 079 078 | 1/2013 |
| EP | 0 290 074 | 11/1988 |
| EP | 0 539 735 | 5/1993 |
| EP | 1 048 595 | 11/2000 |
| EP | 1 295 818 | 3/2003 |
| EP | 1 352 872 | 10/2003 |
| EP | 2 338 813 | 6/2011 |
| FR | 2 918 652 | 1/2009 |
| WO | WO97/45323 | 12/1997 |
| WO | WO97/45347 | 12/1997 |

* cited by examiner

CONVEYOR SYSTEM FOR CONTAINER PROCESSING MACHINES

RELATED APPLICATIONS

This application is the national stage entry under 35 USC 371 of PCT/EP2014/000817, filed on Mar. 26, 2014, which claims the benefit of the Apr. 3, 2013 priority date of German application DE 102013103310.5, the contents of which are herein incorporated by reference.

FIELD OF DISCLOSURE

The invention relates to a conveyor system for container-processing machines.

BACKGROUND

Conveyor systems for delivering containers to and/or removing containers from container machines are known. Known conveyor systems have a rotating conveyor element that has many container holders arranged around a circumference thereof. These container holders move containers from one position to another in the course of delivering containers that are to be processed to a container processing station on the container-processing machine.

Known conveyor systems have a substructure by means of which a conveyor element stands opposite an installation surface that forms part of the structure. Such a substructure can house all sorts of devices, such as the drive for the conveyor element, further functional elements, controllers, and sensors.

A substructure as described above completely or substantially completely fills an installation space between the conveyor element and the installation surface. As a result, the installation space can no longer be used for any other purpose.

SUMMARY

Among the objects of the invention is a conveyor system that guarantees a more flexible use of the installation space underneath the conveyor element.

In one aspect, a securing installation that stands on an installation surface suspends a conveyor element. As a result of this suspended arrangement, a substructure-free space forms under the conveyor element. This space can be used for many things. The result is a more flexible conveyor system.

In one embodiment, a rack spans at least part of the conveyor element. This rack forms the securing installation. The rack can have one or more floor-standing and/or floor-anchored columns that are tall enough so that the top free ends of the columns are above the conveyor element. When there are multiple columns, a connecting element connects the free ends to each other. In some embodiments, this connecting element is a plate.

In one embodiment, the securing installation has a structural element that forms a vertical machine axis. The conveyor element surrounds the circumference of this structural element. The structural element is preferably a rod or cylinder connected at its top free end at least indirectly to at least one column. The connection is preferably one that resists rotation. The structural element thus forms a connection between the part of the securing installation provided on the top and the functional elements to be mounted underneath, under the conveyor element.

In one embodiment, the structural element projects beyond an underside of the conveyor element. In this embodiment, further guide or transfer installations that interact with the conveyor element are held on the projecting section of the structural element. Examples of guide or transfer installations of this kind include guide panels and external guides. In this way, further installations are held underneath the conveyor element supported by the securing installation without any substructure needing to be provided. This allows for a light structure with just a few components and thus a reduction in components in, for example, a sterile area of a container-processing machine.

In some embodiments, a conveyor delivers containers to a conveyor element and/or removes containers from the conveyor element. The securing installation on which the conveyor element is mounted also supports the conveyor. The conveyor can be a linear conveyor, such as a conveyor belt or a conveyor chain. Because this conveyor is mounted on the securing installation, no corresponding substructure in the area of the conveyor element is needed.

In some embodiments, a single conveyor delivers containers to and removes containers from the conveyor element. The conveyor element is preferably designed to both deliver a container to be processed to a container-processing machine and to also remove an already-processed container from the container-processing machine. This occurs when a container holder that has become free as a result of having delivered a container is filled in the next process step by an already-processed container so that a further rotation of the conveyor element removes the already-processed container and delivers it to the conveyor. In this way, a single conveyor running in the area of the conveyor element can be used to both deliver containers to be processed and to remove containers already processed.

In some embodiments, the conveyor runs under the conveyor element. This can be done because the absence of substructure frees installation space.

In other embodiments, the conveyor is fed in a straight line under the conveyor element. In this case, the conveying direction for delivering containers to be processed is the same as the conveying direction for removing already-processed containers.

In some embodiments, the conveyor runs through the center of the conveyor element so that the machine axis runs through the conveyor. This causes optimum delivery of the containers in the direction of the center point of the substantially annular-shaped conveyor element.

Other embodiments include a direct drive or a torque motor as the drive for the conveyor element. This allows a further saving of installation space. The drive is arranged above the conveyor element between the conveyor element and a top structural element of the securing installation arranged in a rotation-proof manner. In some embodiments, the drive is designed on the circumferential side around the structural element that forms the axis of rotation for the conveyor element. Embodiments include those in which the drive drives the conveyor element in a phased or intermittent manner to deliver the containers to the container-processing machine step by step.

In some embodiments, the drive is arranged between a first drive element that is held stationary on the securing installation and a second drive element mounted on the structural element so that it can rotate. The first drive element and the second drive element are preferably sleeves, with one being inside the other and forming an annular gap. The first drive element has a larger diameter than the second drive element. The drive elements are arranged concentric with each other and are aligned with the first machine axis. A pivot bearing between the first and second drive element can be turned relative to the first drive element or relative to the structural element arranged in a rotation-proof manner and that forms the first machine axis. The second drive element forms the drive shaft of the drive.

In some embodiments, the second drive element extends by a first end into either the drive itself or into the first drive element. The second drive element is then connected at a second end to the conveyor element. In these embodiments, the second end of the second drive element protrudes beyond the underside relative to the first drive element. This creates a projecting free end on which the conveyor element can be secured.

In some embodiments, the conveyor element is a transfer star. In other embodiments, the conveyor element comprises a circular disc. In yet other embodiments, the conveyor element is separate from the recesses that form the container holders on the circumference on the conveyor element. As a result of any of the foregoing features, the containers can be moved on a circular path through the conveyor element. The container inlet, the transfer position onto the container-processing machine, and the container outlet are all on this circular path.

In one aspect, the invention features an apparatus for at least one of delivering containers to a container-processing machine and removing containers from the container-processing machine. Such an apparatus includes a conveyor system that has a conveyor element that rotates about a vertical machine axis and that has container holders distributed around a circumference thereof. A securing installation suspends the conveyor element. The conveyor element moves containers from a first position to a second position. The securing installation includes a structural element that is arranged circumferentially around the conveyor element. This structural element forms the vertical machine axis about which the conveyor element rotates. The structural element comprises a projecting portion that protrudes beyond an underside of the conveyor element. A functional element is held at this projecting portion. The functional element, which is either a guide element or a transfer element, is one that interacts with the conveyor element.

In some embodiments, the securing installation comprises a rack that at least partially spans a top of the conveyor element.

In other embodiments, the structural element is held on the securing installation in a manner that prevents rotation thereof.

In yet other embodiments, the conveyor element surrounds a circumference of the structural element.

Certain embodiments include a conveyor, at least a section of which is supported by the securing installation. This conveyor conveys containers. Among these embodiments are those in which the conveyor either delivers containers to the conveyor element or removes containers from the conveyor element, and those in which it both delivers containers to the conveyor element and removes containers from the conveyor element. Also among these embodiments are those in which the conveyor runs under the conveyor element. These embodiments include those in which the conveyor runs along a path that intersects the vertical machine axis of the conveyor element and that is centered around the vertical machine axis.

Other embodiments include a drive that drives the conveyor element. The drive is either a direct drive or a torque motor. Some of these embodiments also include first and second drive elements. In these embodiments, the drive is arranged between the first drive element and the second drive element. The first drive element is held stationary on the securing installation. The second drive element surrounds the structural element around a circumference thereof. In some of these embodiments, the second drive element comprises a hollow shaft having first and second ends. The hollow shaft extends by the first end into the drive. The second end connects and wherein the hollow shaft is connected on the second end to the conveyor element.

Embodiments also include those in which the conveyor element comprises a transfer star.

Also among the embodiments are those in which the functional element is a guide element that guides bottles along a path, those in which the functional element is a transfer element that permits bottles to be slid along a path, and those in which there is more than one kind of functional element.

Another aspect of the invention features a conveyor system that includes a rotating conveyor element with container holders arranged around a circumference thereof for moving containers between container positions, and a securing installation that suspends the conveyor element. The securing installation includes a structural element that forms an axis of rotation. A projecting portion of the structural element projects beyond the conveyor element's underside. An element, which is either a transfer element or a guiding element is held at this projecting portion so that it can interact with the conveyor element.

As used herein, the expressions "substantially" or "approximately" mean deviations from exact values in each case by ±10%, and preferably by ±5% and/or deviations in the form of changes that are not significant for functioning.

Further developments, benefits, and applications of the invention arise also from the following description of examples of embodiments and from the figures. Moreover, all characteristics described and/or illustrated individually or in any combination are categorically the subject of the invention, regardless of their inclusion in the claims or reference to them. The content of the claims is also an integral part of the description.

BRIEF DESCRIPTION OF THE DRAWINGS

These and other features of the invention will be apparent from the following detailed description and the accompanying figures, in which.

DETAILED DESCRIPTION

Figure 1:
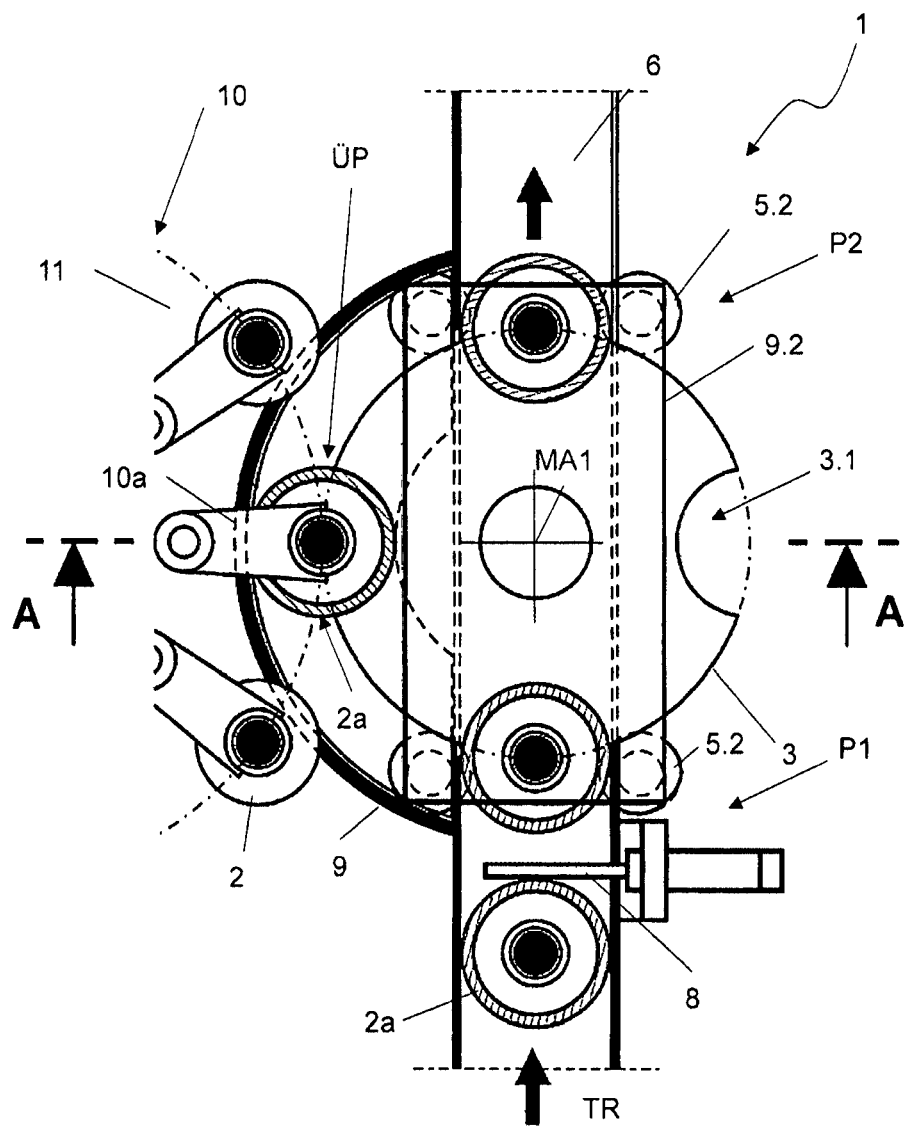
FIG. 1 shows a top view of a first embodiment of a conveyor system.
Figure 2:
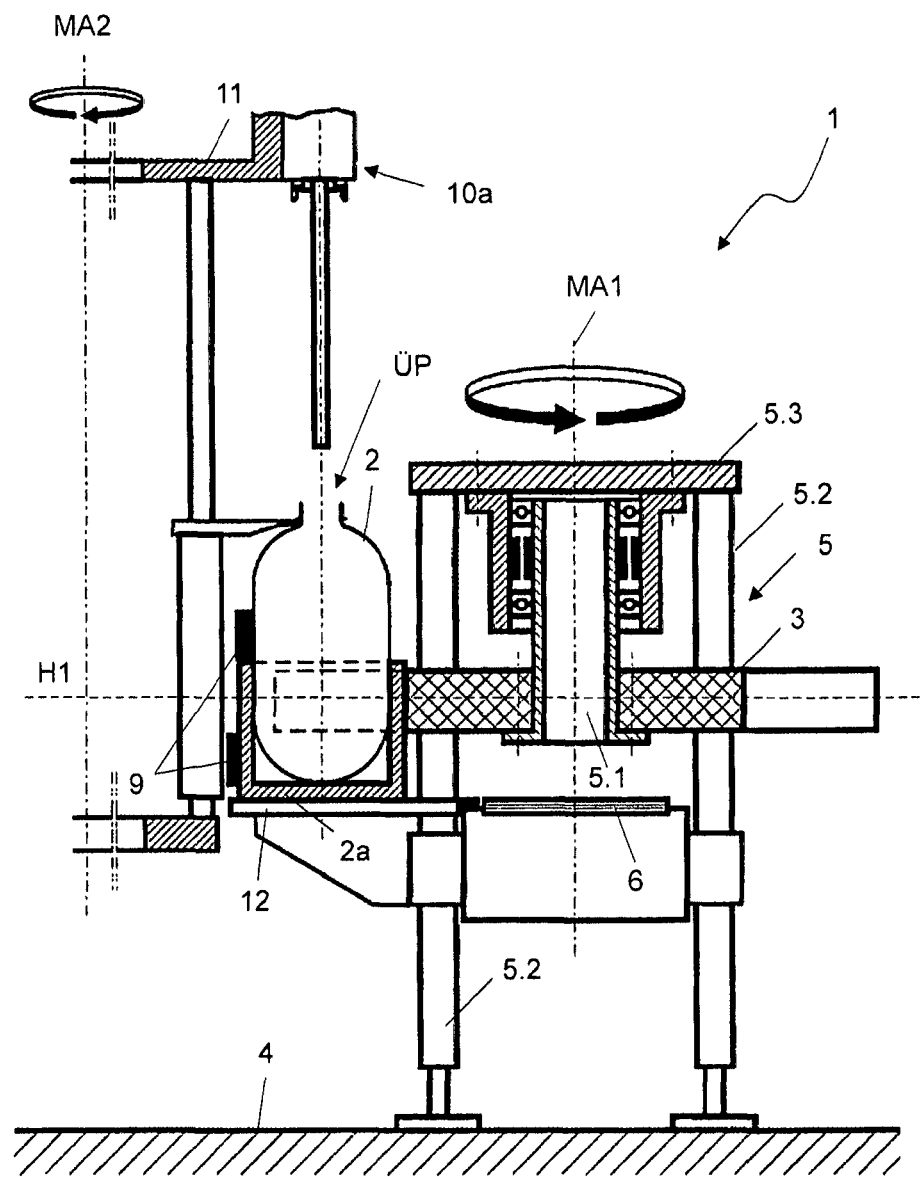
FIG. 2 shows a lateral cross-section of the conveyor system of FIG. 1 along the line A-A.

FIGS. 1 and 2 show a conveyor system 1 that is used to deliver containers 2 to a container-processing machine 10 and to remove already-processed containers 2 from the container-processing machine 10.

The conveyor system 1 comprises a conveyor element 3 that is driven to rotate about a vertical machine axis MA1 and that conveys containers 2 on an at least partially circular path. The conveyor element 3 has container holders 3.1 distributed around the circumference thereof and spaced apart at fixed angular distances. In some embodiments, the conveyor element 3 is a transfer star. In other embodiments, the conveyor element 3 is a substantially disc-like structure in which recesses formed in a circumference thereof form the container holders 3.1. The recesses are adapted to the containers 2 or container holders 2a to be conveyed.

In the illustrated embodiment, container holders 2a, also called "pucks," secure containers during delivery and removal thereof. Such container holders 2a are particularly useful for containers 2 that tend to topple over or containers that have no independent floor-standing area. An example of such a container is a PET keg. These are large-volume plastic containers volumes such as 10 liters, 20 liters, or 30 liters. However, it is also possible to use the conveyor system to convey containers 2 directly, without having to use a container holder 2a. To simplify the exposition that follows, any reference to a container 2 is to be regarded as a reference to either a container 2 or a container holder 2a.

As shown in FIG. 1, a conveyor 6 delivers upright containers 2 to a stopper element 8. The stopper element 8 temporarily stops the container 2 so that it cannot reach the conveyor element 3. At an appropriate time, the stopping element 8 releases the container 2 so that it can continue to the conveyor element 3.

Recesses around the circumference form container holders 3.1 that carry the containers 2 through the conveyor element 3. Each recess holds a container 2 at least partially around a circumference thereof. The stopper element 8 releases a stopped container 2 in a time-phased manner so that the conveyor 6 can take it to a container holder 3.1 of the conveyor element 3.

Starting from an inlet P1, the conveyor element 3 moves the container 2 clockwise to the transfer position UP at which the transfer of the container 2 to the container-processing machine 10 takes place. An outer guide 9 prevents the container 2 from swerving laterally or radially. The outer guide 9 runs at least in a partial circular path around the conveyor element 3 at a radial distance from the conveyor element 3.

A drive 7, such as a servo motor, drives the conveyor element 3 in a phased manner. This results in intermittent motion of the conveyor element 3, and thus intermittent delivery of containers 2 located in the container holders 3.1 to the transfer position UP.

The conveyor element 3 delivers containers 2 still to be processed to the container-processing machine 10 and also removes already-processed containers 2 from the container-processing machine 10. In particular, the conveyor element 3 delivers a container to be processed to the transfer position UP for delivery to a processing station 10a of the container-processing machine 10.

In some embodiments, the container-processing machine 10 is a rotating machine having a rotor 11. On the circumference of this rotor 11 are processing stations 10a spaced at fixed angular distances from each other. The rotor 11 is driven to rotate intermittently or in a phased manner around a second machine axis MA2 that is parallel to the first machine axis MA1.

Once a container 2 has been transferred to a processing station 10a, the container holder 3.1 becomes free. This means it is ready to accept another container. To take advantage of this, the rotor 11 turns while the conveyor element 3 remains stationary. This means that the container holder 3.1, which has just been freed, also remains stationary. As a result, a container that has already been processed can be loaded from the processing station 10a into the recently-freed container holder 3.1.

A phased further rotation of the conveyor element 3, then delivers the already-processed container 2 to an outlet P2 to be conveyed away by a conveyor 6. Alternatively, it is possible to deliver the already-processed container 2 to a further container-processing machine. Meanwhile, the same phased further rotation of the conveyor element 3 delivers the next container to be processed to the transfer position UP.

As can be seen in particular in FIG. 1, the same conveyor 6 handles both delivery of the containers 2 to the inlet P1 of the conveyor element 3 and the removal of the containers 2 from the outlet P2 of the conveyor element 3. In the illustrated embodiment, this single conveyor 6 is a linear conveyor. A suitable linear conveyor is a conveyor belt or conveyor chain.

After reaching the inlet P1, the conveyor 6 dips underneath the conveyor element 3 as shown in FIG. 2 and by the dashed lines in FIG. 1. The conveyor 6 runs underneath and passes through the point at the center of the conveyor element 3 so that it is pierced by the first machine axis MA1. By routing the conveyor 6 under the conveyor element 3, it is possible to effect delivery and removal by a single continuous conveyor 6.

The conveyor element 3 is designed without a substructure to allow the conveyor 6 to be routed underneath the conveyor element 3. This substructure-free design is achieved by suspending the conveyor element 3 from a securing installation 5 standing on an installation surface 4, as shown in FIG. 2.

In the embodiment shown, the securing installation 5 is a rack supported above the installation surface 4 by four columns 5.2. The columns 5.2 are tall enough so that their top free ends are above the height level H1 of the conveyor element 3. As shown in FIG. 1, two of the four columns 5.2 stand on either side of the inlet P1 and the remaining two of the four columns 5.2 stand on either side of the outlet P2.

A connector 5.3, shown in FIG. 2, connects the top free ends of the columns 5.2. In one embodiment, the connector 5.3 is a plate that suspends the conveyor element 3.

A cylinder 5.1 on the underside of the connector 5.3 facilitates the suspension of the conveyor element 3. The cylinder 5.1 runs vertically along the first machine axis MA1. The cylinder 5.1, which is solid or hollow, forms an axis about which the conveyor element 3 rotates.

The cylinder 5.1 connects to the connector 5.3 in a way that prevents the cylinder 5.1 from rotating. The length of the cylinder 5.1 is selected such that it either ends flush with the underside of the conveyor element 3 or such that it projects slightly beyond the conveyor element 3. As a result, it is possible to pass the conveyor 6 underneath the cylinder 5.1.

The securing installation 5, which is partially built over the conveyor element 3, provides a place to mount further functional elements that are involved in the delivery of containers 2 to the container-processing machine 10 or removal of containers 2 from the container-processing machine 10.

The conveyor 6 runs between the columns 5.2 of the securing installation 5. Brackets of the conveyor 6 are connected to the columns 5.2. In some embodiments, slide panels 12 and/or an outer guide 9 are arranged on the securing installation 5, for example on its columns 5.2. The slide panels 12, which can be seen in FIG. 2, allow surfaces of containers 2 to slide as they move through the conveyor element. The outer guide 9 prevents radial swerving of containers as they move through the transport element 3.

Figure 3:
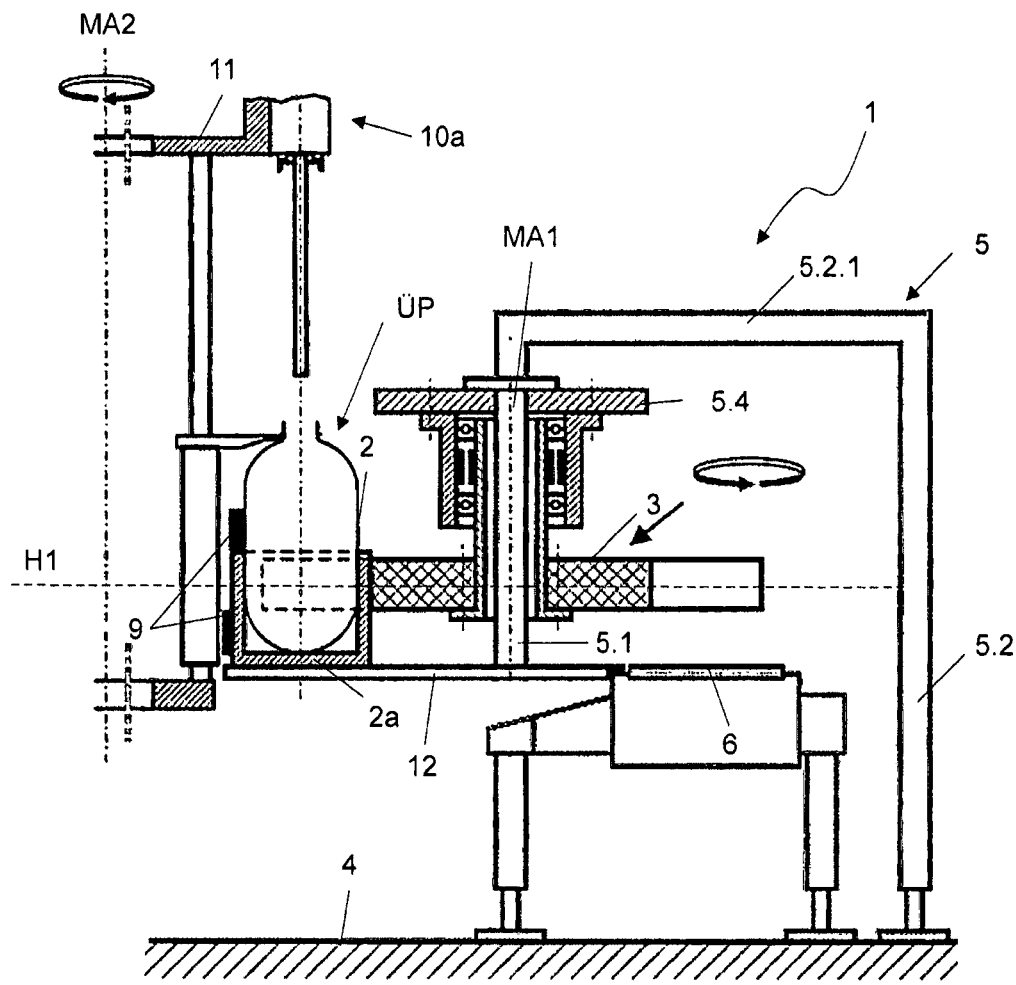
FIG. 3 shows a lateral section of a second embodiment of a conveyor system.

FIG. 3 shows a further embodiment of the conveyor system 1 in which the securing installation 5 has a column 5.2 that stands on an installation surface 4. The column 5.2 has an arm 5.2.1 that at least partially spans the conveyor element 3. The arm 5.2.1 extends horizontally above the conveyor element 3. A cylinder 5.1 secured to the arm 5.2.1 extends downward and forms the first machine axis MA1 of the conveyor element 3.

In the illustrated embodiment, a projecting free end of the cylinder 5.1 projects beyond an underside of the conveyor element 3. Functional elements that interact with the conveyor element 3 are secured on this projecting free end. Examples of such functional elements include, for example, the slide panel 12 on which containers 2 are moved by sliding when the conveyor element 3 is rotated. In the embodiment shown, an outer guide 9 is indirectly held on the cylinder 5.1.

In the illustrated embodiment, the conveyor 6 is fed under the conveyor element 3 so that it follows a path that is off to one side of the first machine axis MA1. In particular, the conveyor 6 follows a path that is on the side of the first machine axis MA1 that is furthest from the container-processing machine 10. In the illustrated embodiment, the conveyor 6 is held on an independent installation device. However, in other embodiments, the conveyor 6 is held on the securing installation 5 of the conveyor element 3.

Figure 4:
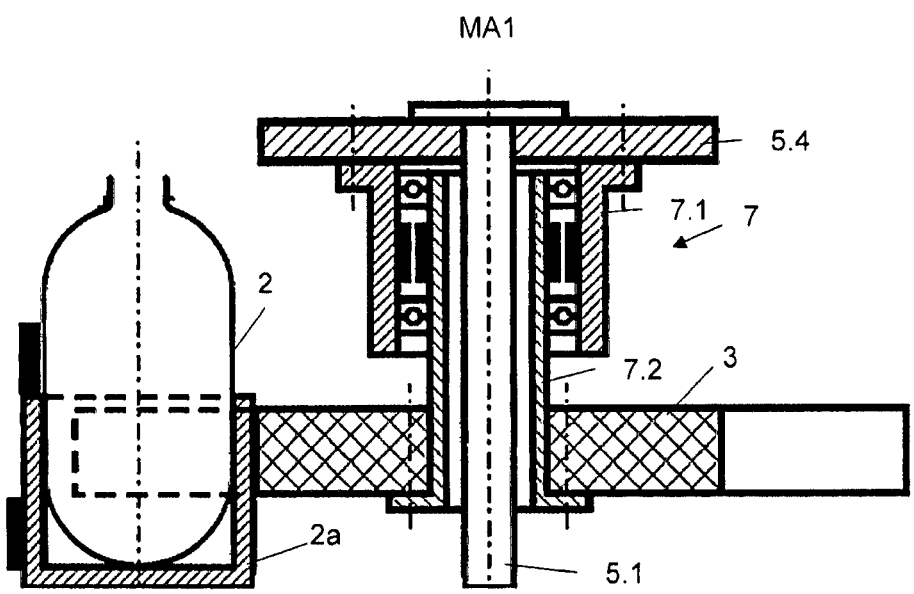
FIG. 4 shows a lateral section of details of a conveyor element having an assigned drive.

FIG. 4 shows a drive 7 for imposing a torque on the conveyor element 3. In some embodiments, the drive 7 is a direct drive. In other embodiments, the drive 7 is a torque motor. The drive 7 is between a plate 5.4 that is firmly connected to the securing installation 5 and the conveyor element 3. Alternatively, the drive can be connected to the connector 5.3.

A first outer drive element 7.1 of the drive 7 extends from an underside of the plate 5.4 and ends just short of the conveyor element 3. The first outer drive element 7.1 is shaped like a cylindrical sleeve having a circular cross-section. In one embodiment, the outer drive element 7.1 has a flange secured on the plate 5.4 and extending radially outward.

The first drive element 7.1 surrounds the cylinder 5.1. The radius of the first drive element 7.1 is large enough so that a gap separates it from the cylinder 5.1.

A rotatable second drive element 7.2 also extends down from the plate 5.4 concentric with the first drive element 7.1 thus forming an annular intermediate space between itself and the first drive element 7.1. The second drive element is also a cylindrical sleeve having a circular cross section, but with a radius smaller than that of the first drive element 7.1. Bearing points hold the second drive element 7.2 along part of its length within the annular intermediate space in a suspended and rotatable manner relative to the first drive element 7.1.

A protruding free end of the second drive element 7.2 projects past the end of the first drive element 7.1 and attaches to the conveyor element 3. In some embodiments, the second drive element 7.2 passes through a hole in the middle of the conveyor element 3. A radially outward flange on the end of the second drive element 7.2 secures the conveyor element 3 to the second drive element 7.2.

Bearing points in the intermediate space between the first drive element 7.1 and the second drive element 7.2, enable the second drive element 7.2 to be turned. This turns the conveyor element 3 relative to the first drive element 7.1 or the cylinder 5.1.

In addition to accommodating the bearing points, the intermediate space also accommodates windings of the drive 7. The first drive element 7.1 thus forms the stator and the second drive element 7.2 forms the rotor of the drive 7. The intermediate space between the plate 5.4 and the conveyor element 3 is thus optimally used for accommodating the drive 7.

The invention has been described above using several exemplary embodiments. However, modifications and variations are possible without thereby departing from the inventive idea underlying the invention.

Having described the invention, and a preferred embodiment thereof, what is claimed as new and secured by Letters Patent is:

1. An apparatus for at least one of delivering containers to a container-processing machine and removing containers from said container-processing machine, said apparatus comprising a conveyor system, said conveying system comprising a conveyor element, a conveyor that is configured to convey containers, to deliver containers to said conveyor element, and to remove containers from said conveyor element, said conveyor running under said conveyor element, container holders, a securing installation that supports at least a section of said conveyor, a structural element, and a functional element selected from the group consisting of a guide element and a transfer element, wherein said conveyor element rotates about a vertical machine axis, wherein said container holders are circumferentially arranged around said conveyor element, wherein said conveyor element moves containers from a first position to a second position, wherein said securing installation stands on an installation surface, wherein said securing installation suspends said conveyor element, wherein said structural element is a constituent of said securing installation, wherein said structural element forms said vertical machine axis, wherein said structural element comprises a projecting portion that protrudes beyond an underside of said conveyor element, wherein said functional element interacts with said conveyor element, and wherein said functional element is held at said projecting portion.

2. The apparatus of claim 1, wherein said securing installation comprises a rack that at least partially spans a top of said conveyor element.

3. The apparatus of claim 1, wherein said structural element is held on said securing installation in a manner that prevents rotation thereof.

4. The apparatus of claim 1, wherein said conveyor element surrounds a circumference of said structural element.

5. The apparatus of claim 1, wherein said conveyor is configured to both deliver containers directly to said conveyor element and to remove containers directly from said conveyor element.

6. The apparatus of claim 1, wherein said conveyor runs directly under said conveyor element.

7. The apparatus of claim 1, wherein said conveyor runs along a path that intersects said vertical machine axis of said conveyor element, and wherein said path is centered around said vertical machine axis.

8. The apparatus of claim 1, further comprising a drive, wherein said drive is one of a direct drive and a torque motor, and wherein said drive is configured to drive said conveyor element.

9. The apparatus of claim 8, further comprising a first drive element and a second drive element, wherein said drive is arranged between said first drive element and said second drive element, wherein said first drive element is held stationary on said securing installation, and wherein said second drive element surrounds said structural element around a circumference thereof.

10. The apparatus of claim 9, wherein said second drive element comprises a hollow shaft, wherein said hollow shaft comprises a first end and a second end, wherein said hollow shaft extends by said first end into said drive, and wherein said hollow shaft is connected on said second end to said conveyor element.

11. The apparatus of claim 1, wherein said conveyor element comprises a transfer star.

12. The apparatus of claim 1, wherein said functional element is a guide element that guides bottles along a path.

13. The apparatus of claim 1, wherein said functional element is a transfer element that permits bottles to be slid along a path.

* * * * *